REX DE ORE McDILL.
FRUIT CLEANING AND BRUSHING MACHINE.
APPLICATION FILED FEB. 2, 1922.

1,417,266.

Patented May 23, 1922.
2 SHEETS—SHEET 1.

Inventor
Rex De Ore McDill

By Lester L. Sargent

Attorney

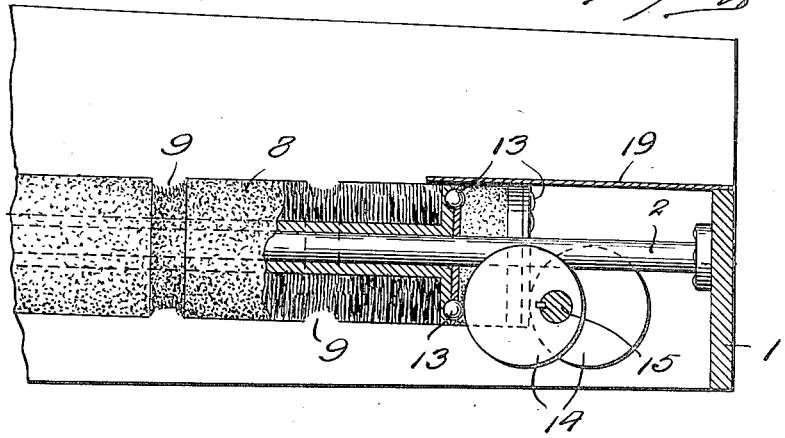
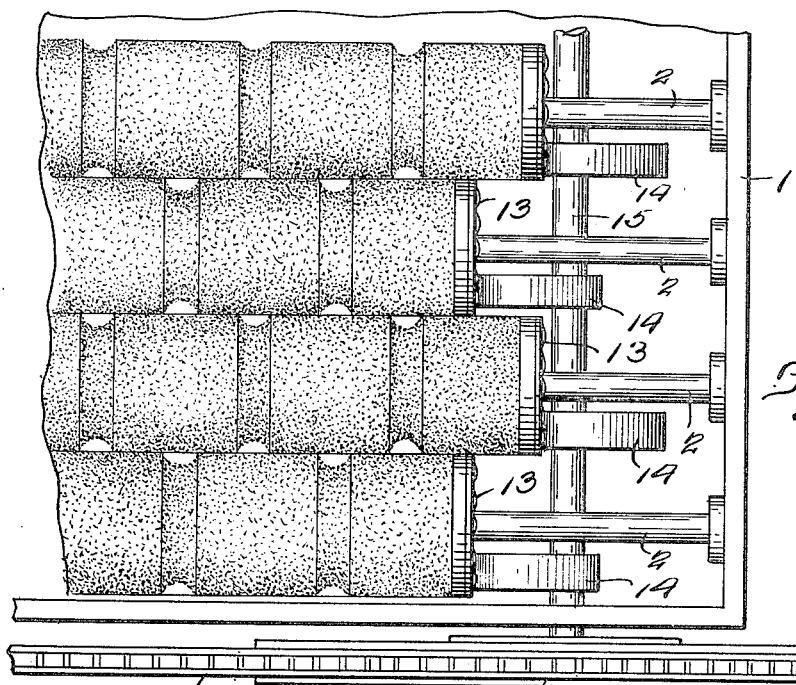

UNITED STATES PATENT OFFICE.

REX DE ORE McDILL, OF HAINES CITY, FLORIDA, ASSIGNOR TO WALTER E. RICHARDSON, OF BEAUFORT, SOUTH CAROLINA.

FRUIT CLEANING AND BRUSHING MACHINE.

1,417,266.    Specification of Letters Patent.    Patented May 23, 1922.

Application filed February 2, 1922. Serial No. 533,642.

*To all whom it may concern:*

Be it known that I, REX DE ORE MCDILL, a citizen of the United States, residing at Haines City, in the county of Polk and State of Florida, have invented a new and useful Fruit Cleaning and Brushing Machine, of which the following is a specification.

The object of my invention is to provide a machine which will effectually clean and polish such fruit as oranges and grapefruit prior to packing same for shipment. It is a further object of my invention to provide a machine which will rapidly clean and polish a large quantity of fruit; and to provide novel means for rotating the fruit while in contact with brushes that are travelling in both a rotary and reciprocating course of travel; and to provide a novel combination and arrangement of parts hereinafter set forth.

I attain these and other objects of my invention by the mechanism illustrated in the accompanying drawings, in which—

Fig. 3 is an enlarged detail longitudinal section on line 3—3 of Fig. 1; and

Fig. 4 is an enlarged top plan of the brushes and eccentric which reciprocates them.

Like numerals indicate like parts in each of the several views.

Figure 1:
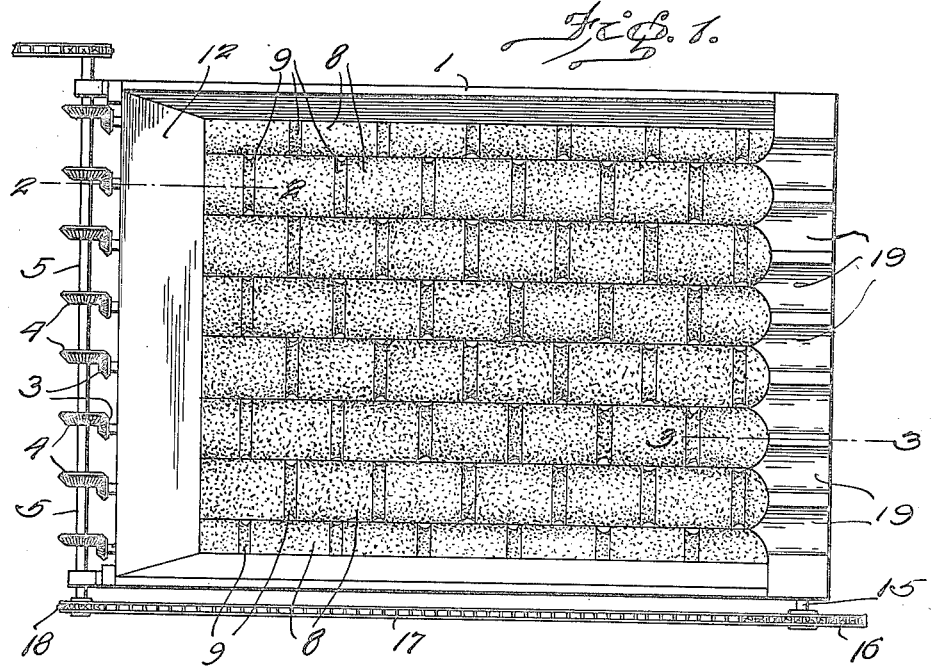
Figure 1 is a top plan of the invention.

Referring to the accompanying drawings, I provide a suitable casing or frame 1 on which are mounted shafts 2 carrying suitable rotating and longitudinally reciprocating brushes 8, said brushes being provided with suitable spaced annular grooves 9. The brushes are reciprocably mounted relative to the frame of the machine by means such as a suitable sleeve 6 longitudinally slidable on the shaft 2 and operatively engaged with said shafts 5 by means of a suitable key 7 engaging the longitudinal keyway 20 of the sleeve, as shown in Fig. 2.

Brush shafts 2 are each provided with a gear 3 meshing with the drive gear 4 on the drive shaft 5 which is driven from any suitable source of power. I preferably provide a suitable bearing plate 10 slidably mounted on the brush shaft 2 and engaging the end of the brush sleeve 6 as shown in Fig. 2. I provide a suitable spring 11 engaging the bearing plate 10 pressing same and the brush sleeve 6 towards the opposite side of the machine.

Figure 2:
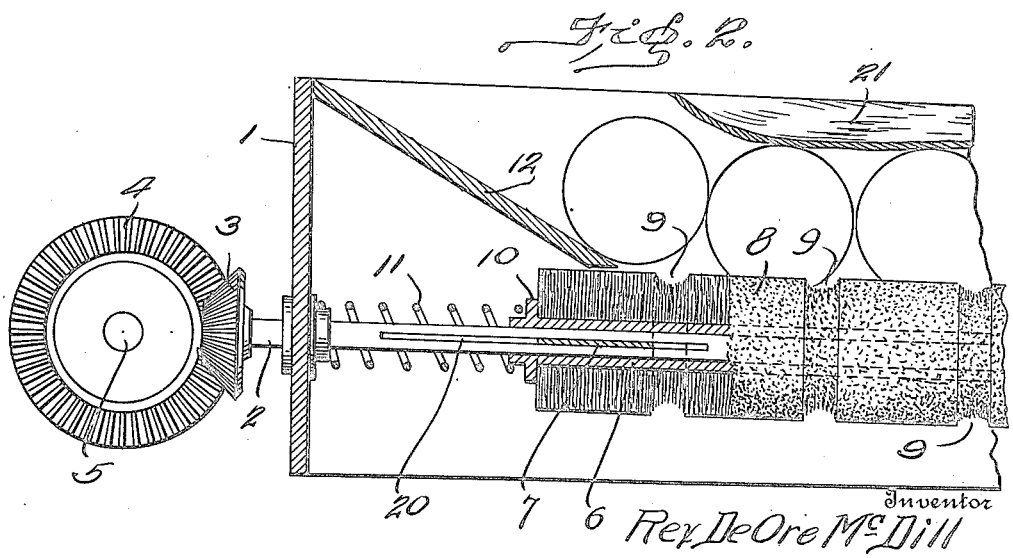
Fig. 2 is an enlarged longitudinal vertical section on line 2—2 of Fig. 1.

Referring to Figs. 1 and 2 I provide a suitable baffle chute 12 for delivering the fruit to be brushed and cleaned on to the top surface of the rotating brushes 8.

As illustrated in Fig. 3 I prefer to provide a suitable ball-bearing plate 13 on the end of the brush sleeve 6. I also provide suitable brush reciprocating elements arranged to reciprocate the brushes. My preferred means being the eccentric 14 keyed on eccentric shaft 15, the peripheries of the eccentric contacting with the ball bearings in the ball bearing plate 13. Mounted on the end of the drive shaft 5, as shown in Fig. 1, I provide a sprocket 18 which drives the sprocket chain 17, which in turn drives sprocket 16 and eccentric shaft 15, to which sprocket 16 is affixed.

As illustrated in Fig. 3, the brush sleeves 8 are mounted in the slightly inclined position relative to the casing 1 of the apparatus and at the lower side of said brush sleeves I provide the discharge chutes 19, as shown in Fig. 1 for the discharge of fruit that has been cleaned and polished by the brushes. I also prefer to provide a suitable fabric blanket element 21 positioned to contact with the top surface of the fruit as it is fed along by the brushes, the fabric being suitably attached to the frame of the machine as illustrated in Fig. 2.

In operation the fruit is fed down the baffle chute 12 on to the top surfaces of the brush sleeves, and is rotated by the brushes 8 with a motion parallel with that of the brushes until it reaches one of the grooves in the brushes, and then the frictional engagement of the groove with the fruit causes the fruit to rotate momentarily in a direction at right angles to its former direction of rotation as the brushes are constantly travelling with a longitudinal reciprocatory movement as well as with a rotary movement, this duplex rotary action effects a thorough cleaning and polishing of the fruit.

A further cleaning action is effected by the brushing of the fruit against the under surface of a blanket 14 of some suitable material, which is attached to the sides of the frame of the machine and disposed in spaced relation over the rollers in position to contact with the top surface of the fruit as it is rotated by the brushes.

As all the brush sleeves are mounted in a slightly inclined position relative to the horizontal the fruit is gradually fed toward the lower side of the machine and is then discharged through the discharge chute 19 into any suitable collection receptacle.

Every other brush is reciprocated in unison, but adjacent brushes are reciprocated alternately or in opposite directions, as illustrated in Fig. 4.

It is also within the contemplation of my invention to utilize this machine for applying a preservative coating to the fruit, as well as for the purposes hereinbefore set forth, the operation of the machine remaining as above described, the preservative solution being first applied to the fruit before it is fed into the machine.

The term "brush" as used in this specification and in the appended claims is to be construed to apply to any suitable brush or polishing element whether the same be the usual form of fibre or hair brush or a buffing cylinder of other material.

What I claim is:

1. A machine for the purposes described, comprising a series of cylindrical brushes, means for rotating the brushes, stationary means for suspending the brushes, and means for alternately reciprocating the brushes longitudinally of said brushes on the stationary suspending means.

2. In a machine for cleaning and polishing fruit, the combination of a series of suspended brushes, means for simultaneously rotating the brushes, and anti-friction devices arranged on the ends of the brushes for approximately frictionless reciprocation of the brushes, and reciprocating means engaging the anti-friction devices and actuating adjacent brushes in opposite directions transversely of the machine.

3. In a fruit cleaning and polishing machine, the combination of a plurality of cylindrical brushes, said brushes having a series of spaced annular grooves to engage the fruit, means for rotating the brush in a uniform direction, and means for reciprocating the brushes longitudinally of said brushes and in a direct transverse relation to the body of the machine.

4. In a machine for the purposes described the combination of a series of adjacent rotatable brushes, means for rotating the brushes simultaneously, means for longitudinally reciprocating every other brush and alternately with adjacent brushes, said brushes being disposed in a uniform inclined position for gradually feeding the fruit longitudinally of the brushes during the brushing operation.

5. In a machine of the class described, the combination of a frame, a series of alined cylindrical brushes mounted in inclined position in the frame, said brushes having spaced annular grooves to engage the fruit, means for rotating the brushes, means for reciprocating the brushes, and a blanket member disposed in spaced relation over the brushes in position to contact with the fruit while it is being operated on by the brushes.

6. In an apparatus of the class described, the combination of a series of rotatable brushes, means for rotating the brushes, means for reciprocating the brushes, said means being arranged to alternately reciprocate adjacent brushes, and a fabric blanket mounted in spaced relation above the brushes and in position to contact with the fruit while it is being operated on by the brushes, whereby to increase the brushing and cleaning action of the machine.

7. In combination with the apparatus described in claim 6, the aforesaid brushes having spaced annular grooves.

8. In combination with the apparatus described in claim 6, said brushes being disposed in a uniformly inclined position to gradually feed the fruit across longitudinally of the brushes while being operated upon, the brushes having grooves to engage the fruit, and a discharge chute to receive and discharge the fruit as it leaves the brushes.

9. In a machine of the class described, the combination of a series of rotatable brushes, said brushes having grooves to engage the fruit, means for simultaneously rotating the brushes, a series of springs normally pressing the brushes in a uniform direction towards one side of the machine and oppositely disposed brush reciprocating elements engaging the opposite end of the machine to longitudinally reciprocate the brushes at predetermined times, adjacent brushes being reciprocated in opposite directions to momentarily change the brushing action on the fruit.

10. A machine adapted to evenly distribute a preservative coating solution over fruit by a simultaneous transverse and rotary action, said machine including a series of brushes having a series of spaced annular grooves on each brush over which the fruit is fed to apply the preservative coating, means for rotating the brushes, shafts on which the brushes are mounted and rotated, and means for alternately reciprocating adjacent brushes on said shafts in a direct transverse direction relative to the main carriage of the machine, said means including anti-friction elements, whereby a substantially frictionless operation of the mechanism is obtained.

11. In a machine of the class described, the combination of a series of rotating grooved brushes onto which the fruit is fed, means for alternately reciprocating adjacent brushes, and a fabric blanket superimposed in spaced relation over the brushes and adapted to receive and apply a cleaning liquid to the fruit during the polishing operation.

12. As a new article of manufacture for use in a fruit cleaning and polishing machine, a cylindrical brush, said brush having spaced parallel annular grooves encircling its periphery, and means for rotatably and reciprocably mounting the brush for movement longitudinally of the brush itself.

REX DE ORE McDILL.